(12) United States Patent
Diesing et al.

(10) Patent No.: US 6,701,360 B1
(45) Date of Patent: Mar. 2, 2004

(54) METHOD AND SYSTEM FOR INDEPENDENT CONSOLE ACCESS WITH TRACKING IN A SERVER SYSTEM

(75) Inventors: Scott S. Diesing, Blue Ridge, TX (US); Janis Delmonte, Farmers Branch, TX (US); Robert Alan Hasty, Carrollton, TX (US); David R. Woodham, Frisco, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/548,769

(22) Filed: Apr. 13, 2000

(51) Int. Cl.[7] .............................................. G06F 15/173
(52) U.S. Cl. ....................... 709/223; 709/104
(58) Field of Search ......................... 711/153; 709/104, 709/223; 370/260

(56) References Cited

U.S. PATENT DOCUMENTS

| | | | | |
|---|---|---|---|---|
| 5,541,927 A | * | 7/1996 | Kristol et al. ............... | 370/408 |
| 5,548,724 A | * | 8/1996 | Akizawa et al. ............ | 709/203 |
| 5,630,116 A | * | 5/1997 | Takaya et al. .............. | 707/201 |
| 5,862,329 A | * | 1/1999 | Aras et al. .................. | 709/204 |
| 6,332,180 B1 | * | 12/2001 | Kauffman et al. .......... | 711/153 |

* cited by examiner

Primary Examiner—Zarni Maung
Assistant Examiner—Sindya Narayanaswamy (57) ABSTRACT

A method and system for independent console access including tracking in a server system allows a plurality of users simultaneous access to any of a plurality of data sources associated with the server. The data sources can be associated with partitions into which the server is divided or can be independent of the partitions. The method and system of the invention also allow a first user of the server to connect to one of the data sources through a tracking mirror, which enables a second user of the server to monitor the movements of the first user by connecting, via the tracking mirror, to the same data source to which the first user connects.

20 Claims, 7 Drawing Sheets

METHOD AND SYSTEM FOR INDEPENDENT CONSOLE ACCESS WITH TRACKING IN A SERVER SYSTEM

TECHNICAL FIELD

The present invention relates generally to computer networking, and, more particularly, to a method and system for independent console access including the ability to track the movement of a network administrator in a server system.

BACKGROUND OF THE INVENTION

Server systems, generally referred to as "servers," or "network servers" have been in use for quite some time. Typically, a server connected to a network enables a number of users also connected over the network to access application programs and files located on the server. Typically, the network over which the users connect to the server is known as a local area network (LAN). For example, a LAN may be an Ethernet network, a token ring network, or any other network over which a number of users connect to each other and other devices, such as servers, located on the network. Before the network user can access the server over the network, the server must be initiated, or "booted up" and made available to the users. Servers are typically booted up by a network administrator, who is connected to the server directly (for example, via an RS232 connection), or who is connected to the server over the above-mentioned LAN. In addition to boot up, network administrators require periodic access to the server to perform maintenance and other tasks.

The processing engine of the server can be divided, or "partitioned" into a number of different cells, referred to as "partitions". The operator of the network decides the manner in which the server is partitioned, with one or many partitions being possible. When a server has been divided into a number of different partitions, each partition is, in effect, a server and includes processing, diagnostic and storage functionality. This functionality is accessed by the network administrators through access to data sources corresponding to each partition. The data sources that correspond to each partition allow monitoring of the respective partition. The server may be accessed by connecting directly to the server through a utilities processor, which is connected to the server via, for example, a universal serial bus (USB), or the utilities processor may be accessed by a remotely located network administrator through a local area network (LAN). Furthermore, there are data sources on the server that are common to all partitions. Access to these data sources enables the network administrators to configure, maintain, and operate the server.

Unfortunately, when a server is divided into a number of partitions, a network administrator only has access to one data source at a time. Furthermore, in situations where there are a number of network administrators, each network administrator may only have access to the same data source at any given time.

Therefore, a need exists for a way in which to allow a single network administrator simultaneous access to a number of different data sources, and a way in which to allow a number of network administrators simultaneous access to a number of different data sources in a server. Furthermore, it would be desirable to allow a network administrator the ability to view, or track, the movement of another network administrator through the server.

SUMMARY OF THE INVENTION

The invention provides a method and system for independent console access including tracking in a server.

The invention is a method for independent console access in a server, the method comprising the steps of dividing the server into a plurality of partitions, each partition being an independent server entity and having a data source associated therewith. The data source represents a console in the partition. The method also includes the step of simultaneously accessing a first data source by a first user and a second user, wherein the first user accesses the first data source using a tracking mirror and the second user accesses the tracking mirror such that the second user monitors the first user connected to the first data source.

In architecture, the invention is a system for allowing independent console access in a server. The system includes a plurality of partitions with each partition being an independent server entity, a plurality of data sources in which each data source is associated with one of the plurality of partitions and console access and remote tracking logic associated with the plurality of data sources. The system also includes a plurality of users in communication with the console access and remote tracking logic, wherein the console access and remote tracking logic is configured to allow each of the plurality of users independent access to any of the data sources, and wherein a first user accesses a first data source using a tracking mirror and a second user accesses the tracking mirror such that the second user monitors the first user connected to the first data source.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

Although the preferred embodiment of the method and system for independent console access including tracking in a system server will be described in the context of a particular server environment, the invention is applicable to any server device in which it is desirable to allow a plurality of network administrators simultaneous access to a number of data sources.

The method and system for independent console access including tracking in a system server can be implemented in hardware, software, firmware, or a combination thereof. In the preferred embodiment(s), the invention is implemented in a combination of hardware and software or firmware. The hardware or firmware can be stored in a memory and be executed by a suitable instruction execution system. If implemented in hardware, as in an alternative embodiment, the invention can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The software portion of the method and system for independent console access including tracking in a system server to be described below with reference to FIGS. 4, 5, 6 and 7, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
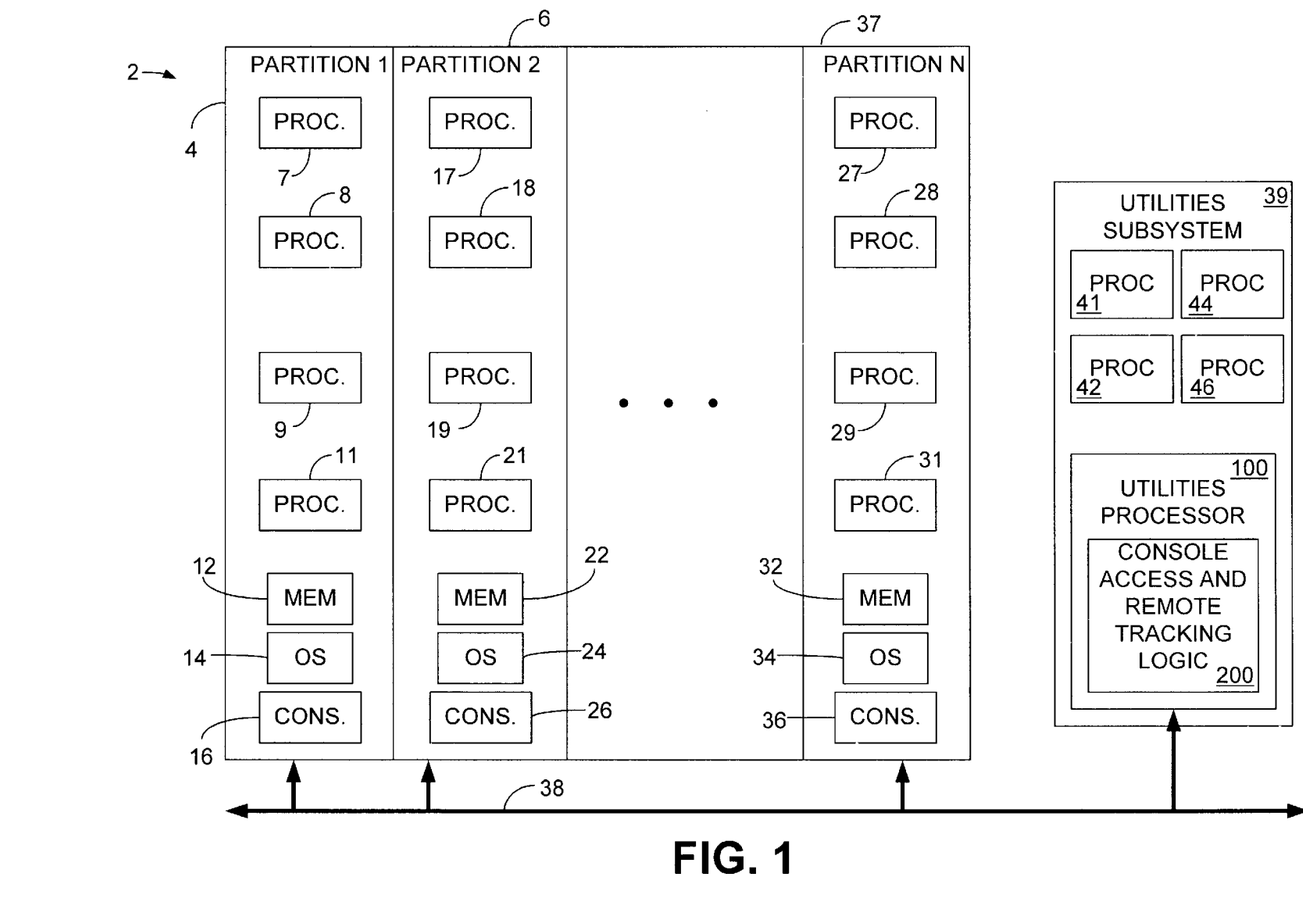
FIG. 1 is a block diagram illustrating a system server in which the console access and remote tracking logic of the invention resides.

Turning now to the drawings, FIG. 1 is a block diagram illustrating a system server 2 (hereafter referred to as "server 2") in which the console access and remote tracking logic 200 of the invention resides. Server 2 is divided into a number of partitions. Each partition can be considered an independent server and includes processing, memory, operating system and maintenance access functionality. For example, partition 4 includes processors 7, 8, 9 and 11, memory element 12, operating system 14 and console 16. Together, the elements within partition 4 constitute a complete server system, although it is still located within overall server 2. In such a server 2, it is possible to have a plurality of partitions. Partitions 4, 6 and 37 are illustrated herein for example purposes only.

Console 16 within partition 4 allows a network administrator (not shown) the ability to access and view the contents of partition 4 in order to provide maintenance and control functions. Each partition 4, 6 and 37 connects to universal serial bus (USB) 38 over which each partition communicates with utilities subsystem 39.

Utilities subsystem 39 includes a number of processor functions 41, 42, 44 and 46 and also includes a utilities processor 100. The utilities processor 100, which will be described in further detail below, allows maintenance and monitoring of server 2. Utilities processor 100 also includes the console access and remote tracking logic 200 of the invention.

Figure 2:
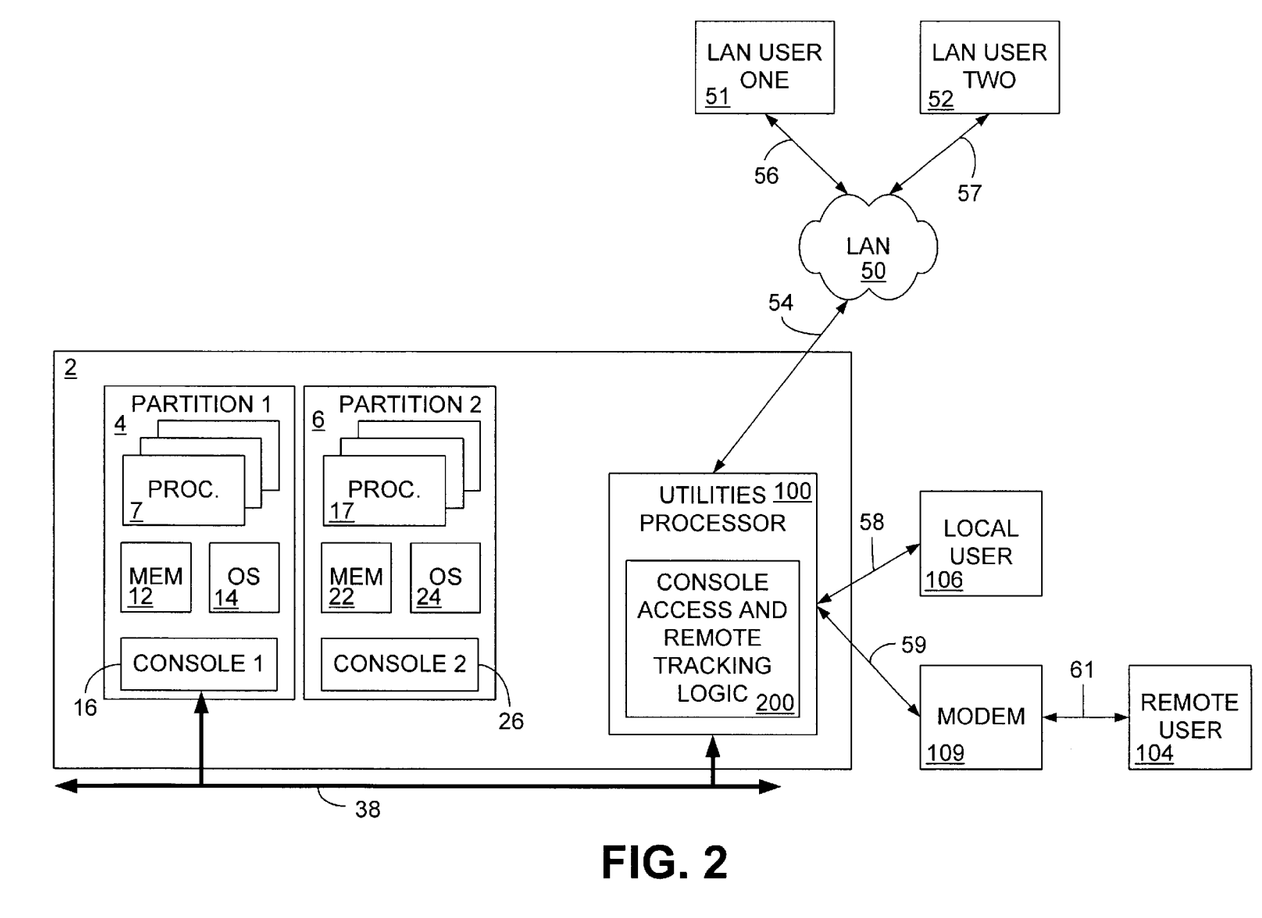
FIG. 2 is a block diagram illustrating the manner in which the server of FIG. 1 may be accessed by local and remote users.

FIG. 2 is a block diagram illustrating the manner in which local and remote users may access the server 2 of FIG. 1. Utilities processor 100 connects to local area network (LAN) 50 via connection 54. Connection 54 can be any of a number of known LAN interfaces LAN user one 51 connects to LAN 50 via connection 56 and LAN user two 52 connects to LAN 50 via connection 57. In this manner, remotely located network administrators, or anyone having the proper access privileges and desiring access to server 2, can connect through LAN 50 with utilities processor 100. Utilities processor 100, as will be described in further detail below, allows remotely connected user one 51 and user two 52 access into server 2.

Utilities processor 100 also allows local users access into server 2. Local user 106 may access the utilities processor 100 via, for example but not limited to, an RS232 connection 58 located on the utilities processor 100. Furthermore, a remote user 104 can access server 2 through utilities processor 100 via connection 61 to modem 109. Modem 109 connects to utilities processor 100 via connection 59. Remote user 104 is distinguished from LAN user one 51 and LAN user two 52 because remote user 104 gains access to utilities processor 100 via modem 109 (a direct dial-in connection) and not via a LAN.

Figure 3:
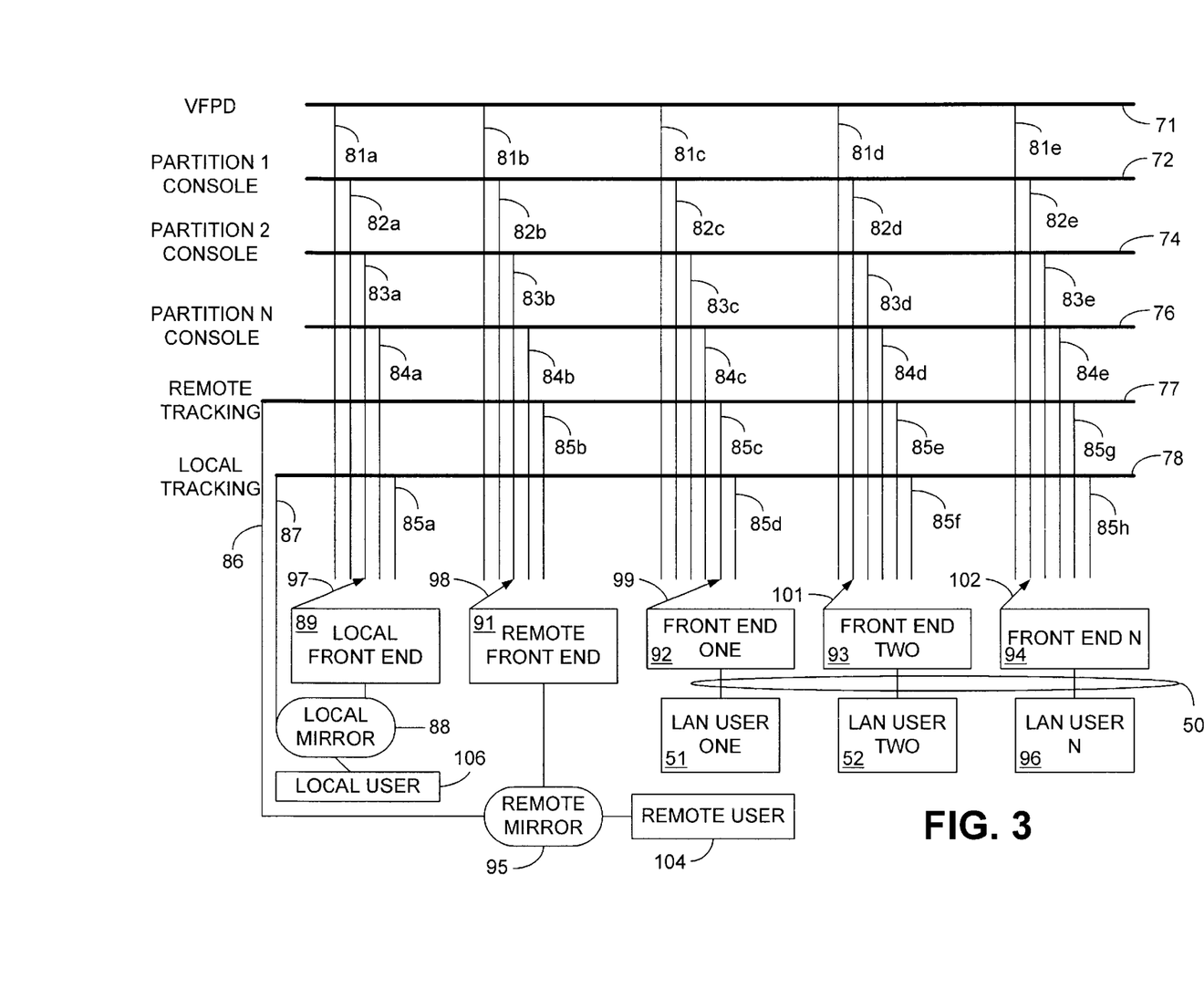
FIG. 3 is a schematic view illustrating the connection of a plurality of users to the various data sources available in the server of FIG. 1 in accordance with an aspect of the invention.

FIG. 3 is a schematic view illustrating the connection of a plurality of users to the various data sources available in server 2 in accordance with an aspect of the invention. The heavy horizontal lines in FIG. 3 each represent a data source within server 2 and available to be accessed by a user. For example, data source 71, which represents a virtual front panel display (VFPD) of server 2 can be accessed by users that connect to the data source via a front-end processor, the operation of which will be described in further detail below. Similarly, data source 72 represents the data available at partition 1 console (16 of FIGS. 1 and 2), and data source 74 includes the data available on partition 2 console (26 of FIGS. 1 and 2). Data source 76 represents the partition and console data available from partition N (37 of FIG. 1).

In accordance with another aspect of the invention, data source 77 represents remote tracking data and data source 78 represents local tracking data. Remote tracking data source 77 connects to mirror 95 via connection 86 and local tracking data source 78 connects to mirror 88 via connection 87. When connecting to the various data sources shown in FIG. 3, a user will either connect directly to the server 2 via either a local connection or a remote connection, or may connect to the server 2 via a LAN (LAN 50 as described in FIG. 2). Regardless of the manner in which a user connects to server 2, the user will connect through a processor commonly referred to as a "front-end processor" located within utilities processor 100. For example, if a local user located at server 2, such as local user 106, wishes to connect to a data source within the server 2, the local user 106 will connect to local front-end processor 89. Although shown as connecting through local mirror 88, a local user may also connect directly to local front-end processor 89. Similarly, if a remote user wishes to connect to a data source within server 2, the remote user 104 would connect through remote front-end processor 91. The modem 109 of FIG. 2 is omitted from FIG. 3 for clarity. It should be noted that local front-end processor 89 and remote front-end processor 91 are distinguishable from the front-end processors (to be described below), to which LAN users will connect.

When local user 106 connects through local front-end processor 89, local user 106 may first connect to mirror 88. Mirror 88 connects via connection 87 to local tracking data source 78. Similarly, when remote user 104 connects to remote front-end processor 91, remote user 104 may connect through mirror 95. Mirror 95 connects to remote tracking data source 77 via connection 86. The operation of local mirror 88 and remote mirror 95 will be described below with respect to FIG. 4.

When a user desires to connect to server 2 via LAN 50, the LAN user will also connect to a front-end processor thereby gaining access to the data sources within server 2. For example, LAN user one 51 connects through LAN 50 to front-end processor 92. Similarly, LAN user two 52 connects to front-end processor 93 and LAN user N 96 connects to front-end processor 94. In accordance with an aspect of the invention, each front-end processor includes the ability to connect the user attached thereto to any of the data sources 71, 72, 74, 76, 77 and 78. In accordance with an aspect of the invention, a plurality of users can be connected to the same data source. For example, LAN user two 52 is connected to data source 72, which corresponds to the partition 1 console 16 of FIG. 1. Similarly, and simultaneously therewith, LAN user N 96 connects through front-end processor 94 also to data source 72. In this manner, two users connected to server 2 through utilities processor 100 can simultaneously view the same data source 72.

In accordance with another aspect of the invention, a user of the server 2 can use a tracking feature in which a first user of the server connects to one of the data sources and in which a second user, using the tracking feature, can connect to the same data source, thereby having the ability to monitor the movement and progress of the first user through the system. For example, remote user 104 connects through remote mirror 95 to remote front-end processor 91. As illustrated by arrow 98, remote front-end processor 91 connects remote user 104 to data source 74 via connection 83b. Data source 74 represents the data available from partition 2 console (26 of FIG. 1 ). In this manner, remote user 104 has established a connection and has access to data source 74. While remote user 104 is still connected to data source 74, LAN user one 51 can access front-end processor 92, and, as illustrated by arrow 99, is connected by the front-end processor 92 to remote tracking data source 77 via connection 85c. Because of this connection, LAN user one 51 connects to remote mirror 95 via connection 86, thereby having the ability to monitor the progress of remote user 104. While illustrated using remote user 104 and LAN user one 51, the tracking feature of the invention can be used by any LAN user to monitor the progress of either remote user 104 or local user 106.

Figure 4:
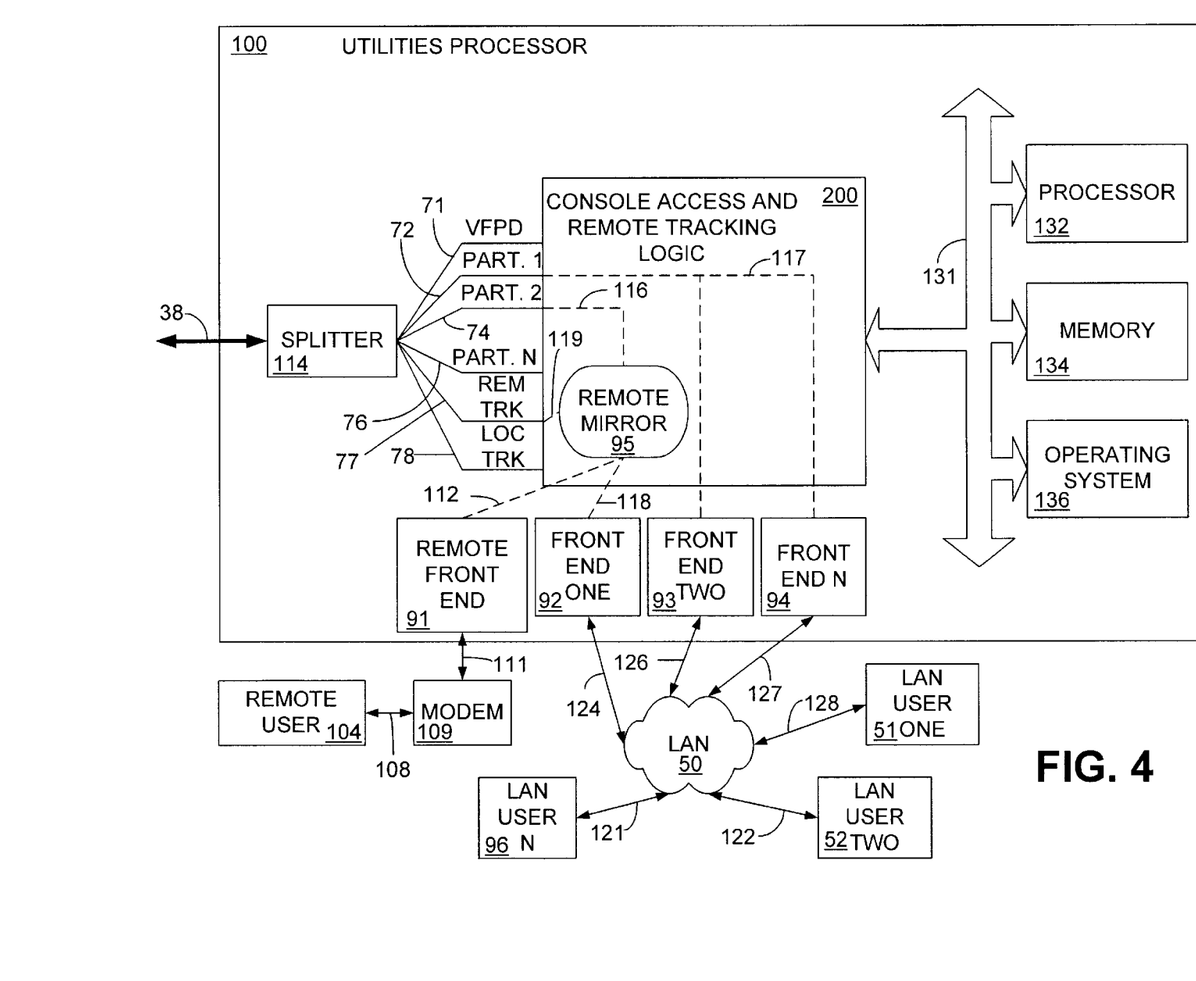
FIG. 4 is a block diagram illustrating the operation of the console access and remote tracking logic of the invention.

FIG. 4 is a block diagram illustrating the operation of the console access and remote tracking logic 200 of the invention. Utilities processor 100 includes processor 132, memory 134, operating system 136 and console access and remote tracking logic 200 in communication via bus 131. In a preferred embodiment of the invention, the console access and remote tracking logic 200 is a software routine that is stored in memory 134 and that executes in processor 132. The console access and remote tracking logic 200 is illustrated as a discrete block in FIG. 4 for simplicity and to illustrate its connections to other elements of the invention.

USB 38 supplies all of the data sources to splitter 114. Splitter 114 divides the data sources on USB 38 into individually accessible data sources and supplies them on individual connections 71, 72, 74, 76, 77 and 78 to console access and remote tracking logic 200.

To illustrate the operation of an aspect of the invention, remote user 104 dials in to utilities processor 100 via modem 109 through connection 111 and connects to remote front-end processor 91. Remote front-end processor 91 presents the remote user 104 with a selection of available data sources. Illustratively, user 104 desires to view the console (26 of FIG. 1) of partition 2 (6 of FIG. 1). In such a case, remote user 104 selects data source 74 and the remote front-end processor 91 connects remote user 104 to data source 74 through mirror 95 and connection 116. Connections 112 and 116 are illustrated as dashed lines because they represent logical connections, not physical connections. The physical connection essentially ends with the USB connection between the partition and the utilities processor 100 at the splitter 114. The data entering the utilities processor 100 via the USB 38 identifies which data source (i.e., 71, 72, 74, 76, 77 or 78) sent the data and the console access and remote tracking logic 200 running on the utilities processor 100 routes the data to the correct C++ console object (to be described below). In accordance with this aspect of the invention, LAN user one 51 connects to LAN 50 via connection 128 and then to front-end processor 92 via connection 124. Similar to remote user 104, LAN user one 51 is presented with a selection of available data sources available for access by front-end processor 92. If LAN user one 51 wishes to monitor remote user 104, then LAN user one 51 selects remote tracking data source 77 and connects through front-end processor 92, via connection 118, to remote mirror 95. Remote mirror 95 connects LAN user one 51 to remote tracking data source 77 via connection 119. Connections 118 and 119 are shown as dashed lines as they also represent logical connections. In this manner, LAN user one 51, through remote mirror 95 and remote tracking data source 77, can monitor the movement of remote user 104 through partition 6 (FIG. 1) of the server 2 (FIG. 1).

In accordance with another aspect of the invention, LAN user two 52 accesses server 2 via LAN 50 where it establishes a connection, via connection 126, with front-end processor 93. Front-end processor 93 presents LAN user two 52 with a selection of data sources available for access. If LAN user two 52 wishes to access the console (16 of FIG. 1) of partition 1 (4 of FIG. 1), the front-end processor 93 connects LAN user two 52 to data source 72 via connection 117. Simultaneously therewith, LAN user N 96 accesses server 2 via LAN 50 and accesses front-end N 94 via connection 127. In accordance with an aspect of the invention, LAN user N 96 may also access the console (16 of FIG. 1) of partition 1 (4 of FIG. 1). In such a case, front-end N 94 connects LAN user N 96 to data source 72 via connection 117. In this manner, and in accordance with this aspect of the invention, both LAN user two 52 and LAN user N 96 can simultaneously connect to and view console (16 of FIG. 1) via data source 72. If one of the users connected to data source 72 decides to monitor another data source, the other LAN user would still remain connected to data source 72.

Figure 5:
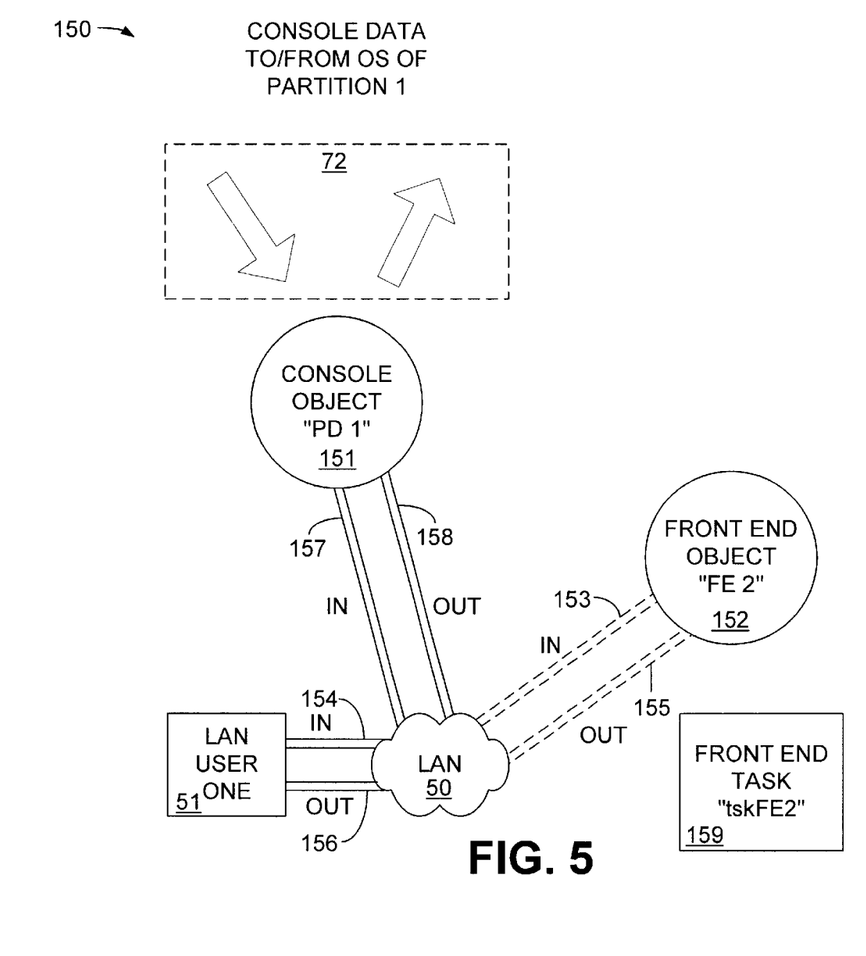
FIG. 5 is a state diagram illustrating the connectivity of a LAN user to one of the data sources of the server of FIG. 1 in accordance with the invention.

FIG. 5 is a state diagram 150 illustrating the connectivity of a LAN user to one of the data sources in the server 2 of FIG. 1 in accordance with the invention. Console object 151 is, in the preferred embodiment, a C++ object that contains all of the data necessary to send and receive information to and from the operating system 14 (FIG. 1) of partition 1 (4 of FIG. 1). Illustratively, console data is exchanged between the operating system of partition 2 (6 of FIG. 1) and console object 150 via data source 72. LAN user one 51 connects to LAN 50 via pipes. The concept of pipes is used to illustrate the logical connections between the elements of FIGS. 5, 6 and 7, and is known to those having ordinary skill in the art. For example, LAN user one 51 connects to LAN 50 via in pipe 154 and out pipe 156. When LAN user one 51 first connects to front-end processor 92, front-end task 159 creates front-end object 152, which communicates with LAN user one 51 via in pipe 153 and out pipe 155. In pipe 153 and out pipe 155 are illustrated using dotted lines to illustrate the concept that once LAN user one 51 makes a decision to access a particular data source (in this case, data source 72), connectivity is transferred from front-end object 152 to console object 151 via in pipe 157 and out pipe 158. In this manner, when a user connects to a front-end processor, the front-end task will direct the user to the desired data source. In effect, front-end object 152 receives data from console access and remote tracking logic 200 and presents the user with a menu providing the data source choices available to that user.

Figure 6:
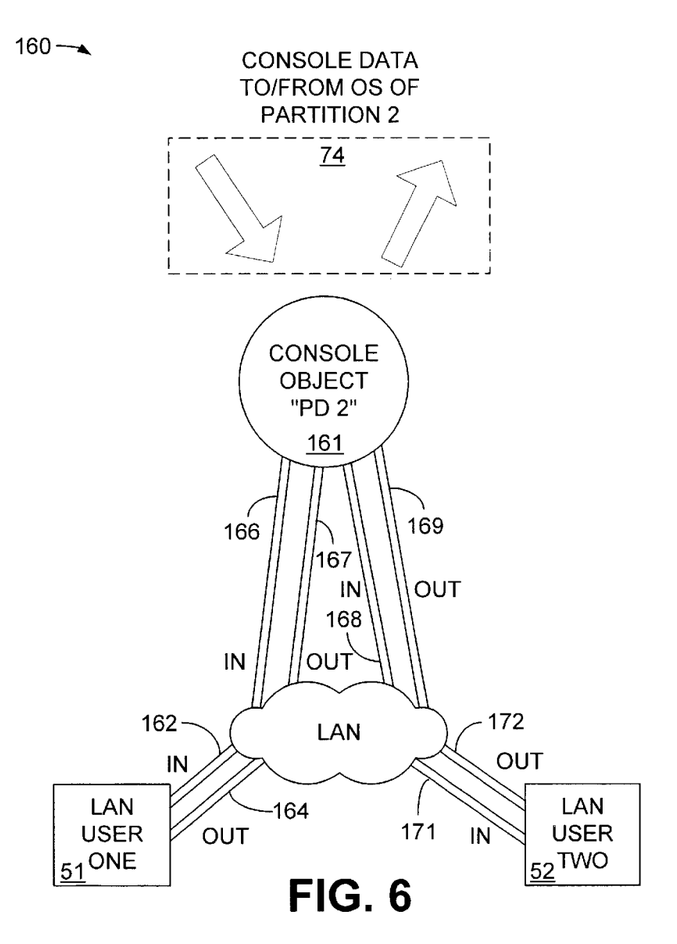
FIG. 6 is a state diagram illustrating multiple LAN users connected to the same data source in accordance with the invention.

FIG. 6 is a state diagram 160 illustrating multiple LAN users connected to the same data source in accordance with the invention. Console object 161 sends and receives console data from the operating system 24 (FIG. 1) of partition 2 (6 of FIG. 1) and illustratively represents data source 74. LAN user one 51 connects via in pipe 162 and out pipe 164 with LAN 50 and connects from LAN 50 to console object 161 via in pipe 166 and out pipe 167. Simultaneously, LAN user two 52 connects via in pipe 171 and out pipe 172 with LAN 50, which connects LAN user two 52 to console object 161 via in pipe 168 and out pipe 169. In this manner, two LAN users (LAN user one 51 and LAN user two 52) can simultaneously connect to the same data source 74.

Figure 7:
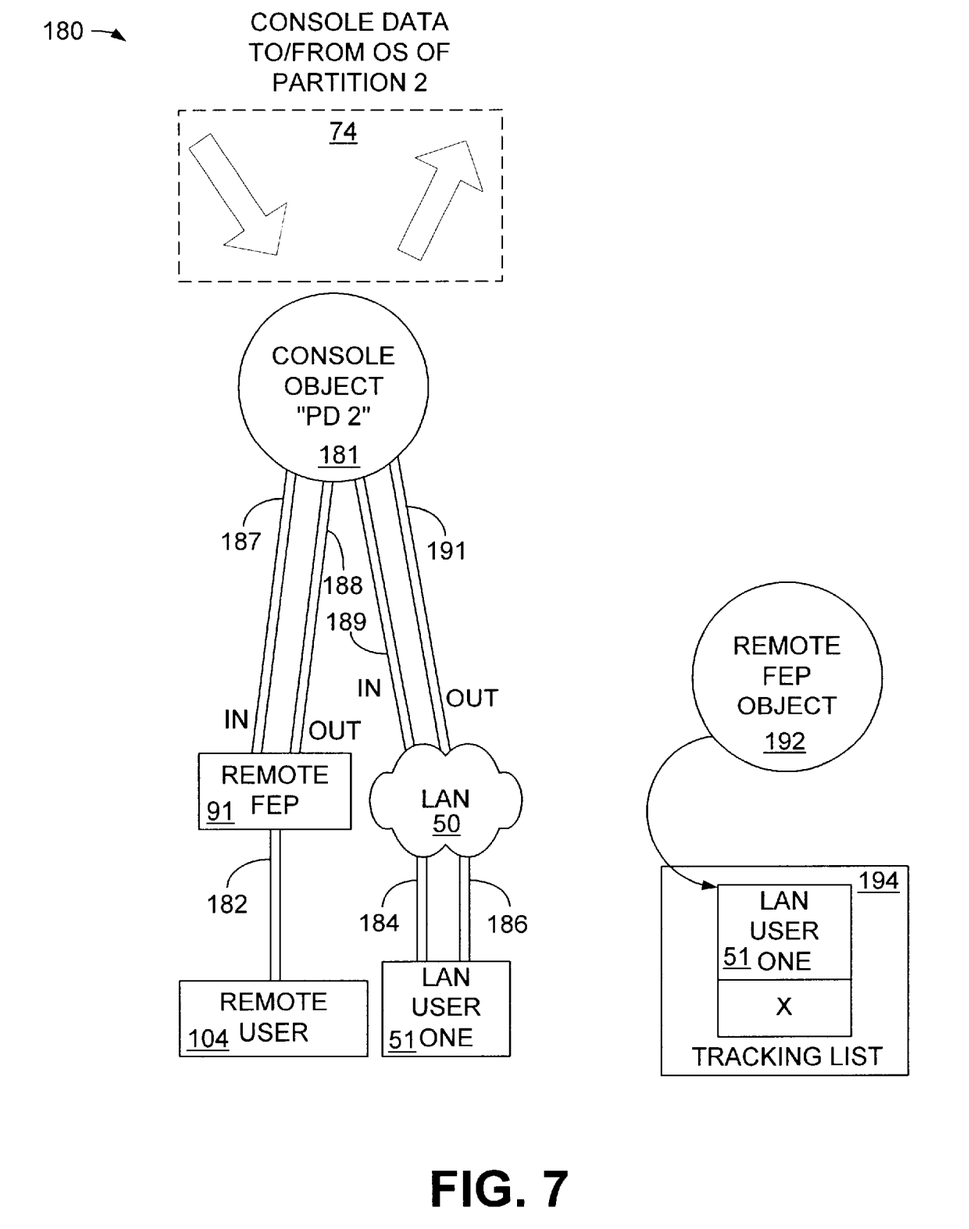
FIG. 7 is state diagram illustrating the tracking feature aspect of the invention.

FIG. 7 is state diagram 180 illustrating the tracking feature aspect of the invention. Console object 181 sends and receives console data from the operating system 24 (FIG. 1) of partition 2 (6 of FIG. 1) and illustratively represents data source 74. Remote user 104 connects via connection 182 to remote front-end processor 91. Remote front-end processor 91 connects via in pipe 187 and out pipe 188 to console object 181. In this manner, remote user 104 connects into server 2 (FIG. 1) and accesses data source 74. While remote user 104 is connected to and accessing data source 74, LAN user one 51 connects via in pipe 184 and out pipe 186 to LAN 50, which connects LAN user one 51 to console object 181 via in pipe 189 and out pipe 191. In accordance with this aspect of the invention, remote front-end processor object 192 maintains a tracking list 194, which includes information that allows remote front-end object 192 to move the user that is tracking to whatever object the user being tracked is accessing. For example, if remote user 104 is currently accessing data source 74 and LAN user one 51 is tracking remote user 104, then LAN user one 51 is also monitoring data source 74 by virtue of it tracking remote user 104. If remote user 104 moves to, for example, data source 72, then remote front-end processor object 192 consults tracking list 194 and discovers that LAN user one 51 should be switched to data source 72 because LAN user one 51 is tracking remote user 104. In essence, remote front-end processor object 192 would send a command to the front-end processor 92, through which LAN user one 51 is connected to remote tracking data source 77, instructing front-end processor 92 that LAN user one 51 should now be connected to data source 72. In accordance with this aspect of the invention, remote front-end processor object 192 maintains tracking list 194, which includes all the information as to which user is tracking which user.

It will be apparent to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

What is claimed is:

1. A method for independent console access of a server, the method comprising the steps of:

dividing the server into a plurality of partitions, each partition being an independent server entity having a data source associated therewith, said data source representing a console in said partition; and accessing a first data source via a utilities processor by a first user and a second remotely-coupled user, wherein said first user accesses said first data source using a tracking mirror and said second remotely-coupled user selectively accesses said tracking mirror such that said second remotely-coupled user monitors said first user connected to said first data source.

2. The method of claim 1, further comprising the step of accessing any of a plurality of data sources by any of a plurality users.

3. The method of claim 1, further comprising the step of allowing access to a plurality of data sources by one of said plurality of users.

4. The method of claim 1, wherein said first user is a local user of said server.

5. The method of claim 1, wherein said first user is a remote user of said server.

6. The method of claim 1, wherein said second user accesses said tracking mirror via a local area network (LAN).

7. A system for allowing independent console access of a server, comprising:

a plurality of partitions, each partition being an independent server entity;

a plurality of data sources, each data source associated with one of said plurality of partitions;

a utilities processor having console access and remote tracking logic;

a plurality of users in communication with said utilities processor, wherein said utilities processor is configured to allow each of said plurality of users independent and selective access to any of said data sources, and wherein a first user accesses a first data source using a tracking mirror and a second remotely-coupled user accesses said tracking mirror such that said second remotely-coupled user monitors said first user connected to said first data source.

8. The system of claim 7, wherein said utilities processor further comprises:

an operating system configured to execute said console access and remote tracking logic so that any of said plurality of data sources may be simultaneously accessed by any of said plurality of users.

9. The system of claim 7, wherein said utilities processor further comprises:

an operating system configured to execute said console access and remote tracking logic so as to simultaneously address said plurality of data sources to one of said plurality of users.

10. The system of claim 7, wherein said first user is a local user of said server.

11. The system of claim 7, wherein said first user is a remote user of said server.

12. The system of claim 7, wherein said second user accesses said tracking mirror via a local area network (LAN).

13. A computer readable medium having a program for providing independent console access of a server, the program comprising logic configured to perform the steps of:

identifying a server;

identifying a plurality of partitions within the server, each partition being an independent server entity having a data source associated therewith, said data source representing a console in said partition;

using a tracking mirror to expose a first data source to a first user in response to a request from the first user; and     exposing the first data source to a second user via said tracking mirror in response to a request from the second user such that said second user monitors said first user connected to said first data source.

14. The program of claim 13, further comprising logic configured to perform the step of exposing any of a plurality of data sources to any of a plurality users responsive to a request for access to a particular data source selected from the plurality of data sources by one of the plurality of users.

15. The program of claim 13, further comprising logic configured to perform the step of allowing access to a plurality of data sources by one of said plurality of users.

16. The program of claim 13, wherein said first user is a local user of said server.

17. The program of claim 13, wherein said first user is a remote user of said server.

18. The program of claim 13, wherein said second user accesses said tracking mirror via a local area network (LAN).

19. The program of claim 18, wherein said second user accesses said tracking mirror via a front end coupled to the LAN.

20. The program of claim 13, wherein said first user accesses said tracking mirror via a front end.

\* \* \* \* \*